United States Patent
Grävingholt et al.

(10) Patent No.: US 11,181,134 B2
(45) Date of Patent: Nov. 23, 2021

(54) CONNECTION ASSEMBLY

(71) Applicant: KHS GmbH, Dortmund (DE)

(72) Inventors: Stefan Grävingholt, Witten (DE);
Thomas Greiving, Lüdinghausen (DE);
Berthold Paroth, Dortmund (DE);
Zlatko Sarajlija, Dortmund (DE);
Thomas Stienen, Unna (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 16/763,325

(22) PCT Filed: Nov. 26, 2018

(86) PCT No.: PCT/EP2018/082525
§ 371 (c)(1),
(2) Date: May 12, 2020

(87) PCT Pub. No.: WO2019/110348
PCT Pub. Date: Jun. 13, 2019

(65) Prior Publication Data
US 2020/0332813 A1 Oct. 22, 2020

(30) Foreign Application Priority Data
Dec. 8, 2017 (DE) .................. 10 2017 129 301.9

(51) Int. Cl.
*F16B 5/02* (2006.01)
(52) U.S. Cl.
CPC ..................... *F16B 5/02* (2013.01)
(58) Field of Classification Search
CPC .... F16B 5/02; F16B 5/10; F16B 5/128; F16B 5/0642; F16B 5/0092; F16B 5/0052; Y10T 29/49826; Y10T 29/49947; Y10T 29/49948
See application file for complete search history.

(56) References Cited

U.S. PATENT DOCUMENTS

| | | | |
|---|---|---|---|
| 2004/0126183 A1* | 7/2004 | Steiner | B26D 7/1818 403/348 |
| 2006/0278591 A1 | 12/2006 | Tippets et al. | |
| 2010/0290863 A1 | 11/2010 | Rogers | |

FOREIGN PATENT DOCUMENTS

| | | |
|---|---|---|
| DE | 1286728 B | 1/1969 |
| DE | 2237223 A1 | 2/1974 |
| DE | 10144982 A1 | 4/2003 |
| EP | 0466504 A2 | 1/1992 |
| FR | 2721074 A1 | 12/1995 |
| WO | 2017187464 A1 | 11/2017 |

OTHER PUBLICATIONS

English translation DE2237223 Kraus (Year: 1974).*

* cited by examiner

*Primary Examiner* — Jason L Vaughan
*Assistant Examiner* — Amanda Kreiling
(74) *Attorney, Agent, or Firm* — Occhiuti & Rohlicek LLP (57) ABSTRACT

An assembly for detachably connecting first and second components includes a fastener that transitions between a locking position and a release position. The fastener comprises a first fastening portion and a second fastening portion. The first fastening portion connects to the first component and the second fastening portion connects to the second component. The first and second fastening portions are disposed opposite each other along an axis of the fastener.

22 Claims, 8 Drawing Sheets

CONNECTION ASSEMBLY

RELATED APPLICATIONS

This application is the national stage of international application PCT/EP2018/082525, filed on Nov. 26, 2018, which claims the benefit of the Dec. 8, 2017 priority date of German application DE 102017129301.9, the contents of which are incorporated herein by reference.

FIELD OF INVENTION

The invention relates to an assembly for detachably connecting at least two components using a fastener.

BACKGROUND

Conveying devices used in the beverage industry typically include conveying elements that form a loop. The conveying elements form a horizontal conveying plane. An upper length of the plane is supported against a sliding guides. The conveying elements are typically chains, such has hinged band chains. Such conveying devices operate at high volumes. Typically, they can convey more than 10,000, and in some cases, more than 50,000 units per hour.

SUMMARY

In one aspect, the invention features an assembly for detachably connecting at least two components using a fastener that extends along an axis and that fastens, by releasable clamping, a first component that includes a flat portion with a non-circular opening. The opening's shape matches the cross-section of an extension of a first locking portion such that the first locking portion can be fed through the hole and the fastener clamped to the first component upon rotation of the first fastening portion about an axis of the fastener. Alternatively, the component has a profiled portion that forms a cut-out, the cross-section of which matches a longitudinal section of the locking portion, namely in such a way that releasable clamping of the first fastening portion to the first component is carried out by rotating the first locking portion about the axis, thus causing the first locking portion to become at least partially interlocked in the cut-out. A particular advantage that arises is that it becomes possible to connect the first and second component without the use of a screw connection. Clamping also results in a particularly stable and positionally-fixed connection of the components.

Some embodiments feature a second fastening portion that includes a second locking portion at its free end. The second component has a flat section having a non-circular opening that is used for releasably clamping the second component. In these embodiments, clamping occurs by feeding the second locking portion through the opening and rotating it.

In some embodiments, the second locking portion includes the free-end mounted second locking portion and the second component includes a profiled portion that forms a cut-out whose cross-section is matched to the cross-section of the second locking portion such that it is possible to carry out a releasable clamping of the second fastening portion on the second component by rotating the second locking portion about the axis. As a result of doing so, the cut-out and the second locking portion become at least partially interlocked.

In yet other embodiments, the first fastening portion includes a free-end mounted first locking portion with at least one locking element that extends radially outward from the axis.

Also among the embodiments are those in which the first fastening portion includes a first contact portion that lies adjacent to a free-end mounted first locking portion along axis and that forms a locating slot that extends perpendicularly from the axis.

In other embodiments, a locating slot is configured to partially or fully surround the axis and, in doing so, to form a contact surface on a surface portion that faces the first component.

In yet other embodiments, the fastener is such that, in its locking position, the fastener is rotated with a locking element thereof having been fed through the opening. This rotation causes the fastener to transition from its release position to the locking position. As a result of this rotation, a locking element engages behind the opening to be supported by a flat portion on the side facing away from the second fastening portion. The angle about which the fastener is rotated is 20-90 degrees, with an angle of 40 degrees being preferred.

In another embodiment, rotating the first locking portion causes a locking element to clamp onto a flat portion of the first component on the side facing away from the second fastening portion. This occurs in such a way that the first component is pressed onto the flat portion on the side facing the second fastening portion. In this locking configuration, the first component is pressed against the contact surface of a locating slot and the flat portion is clamped between the contact surface and the locking element.

In yet other embodiments, the fastener includes, in its first locking portion, a clamping body having a cross-section. The cross section a has a greatest length in its lateral cross-section of the locking position on the end portion facing the second component. This length decreases along the axis as one progresses toward the first fastening portion.

Among the embodiments with a clamping body are those in which the clamping body to has straight contact surfaces on opposite sides of its free end portion.

In yet other embodiments, the first component includes a C-shaped profiled portion that forms a cut-out. The profile portion includes a central portion and two lateral leg portions.

In other embodiments that include a clamping body, the clamping body spreads when the fastener is in the locking position. As a result, straight contact surfaces on opposite sides of the clamping body's free end portion clamp against corresponding inner sides of a cut-out formed by a profiled partition, as a result of which the clamping body forms a clamping seat in the cut-out.

In other embodiments that include a clamping body, the clamping body's width matches that of a profiled partition's cross section such that when the fastener is in its release position, the clamping body can enter a the cut-out formed by a profiled portion.

Other embodiments include those in which the second fastening portion includes a second locking portion mounted on a free end thereof. In these embodiments, the second locking portion includes a locking element that extends radially outward from the central longitudinal axis.

In still other embodiments, the second fastening portion includes a second contact portion that lies adjacent to a free-end mounted second locking portion along the axis and that forms a locating slot extending perpendicular to the axis.

Still other embodiments feature a locating slot that is configured to form a contact surface along the circumference of a circle centered on the axis and on a portion of a surface that faces the second component.

Yet other embodiment include those in which the fastener has a locking element that is fed through an opening. To place the fastener into its locking position, the fastener is then rotated relative to the component. In some embodiments, the rotation is a 90-degree rotation. As a result of the rotation, a locking element engages behind the opening so that a flat portion around the opening an on the side away from the first fastening portion supports the locking element.

In one aspect, the invention features an apparatus comprising an assembly for detachably connecting first and second components, the assembly comprising a fastener that transitions between a locking position and a release position. The fastener comprises a first fastening portion and a second fastening portion. The first fastening portion connects to the first component and the second fastening portion connects to the second component. The first and second fastening portions are disposed opposite each other along an axis of the fastener.

In some embodiments, the first fastening portion comprises a free end and a first locking portion is mounted at the free end. A cross section of the first locking portion matches that of a non-circular opening through a flat portion of the first component. After having been fed through the non-circular opening and, after a rotation of the first fastening portion about the axis has placed the fastener in the locking position, the first locking portion is prevented by the flat portion from passing back out through the non-circular opening.

In other embodiments, the second component comprises a profiled portion that forms a cut-out. The cut-out has a cross-section that matches that of a locking portion of the second fastening portion such that the locking portion can be received by the cut-out when the fastener is in the release position and made to form an interlocking fit with the cut-out as rotation of the locking portion about the axis brings transitions the fastener into the locking position.

Yet other embodiments include both of the foregoing features.

For the purpose of the invention the expressions "substantially" or "around" mean variations from the respective exact value by +/−10%, preferably by +/−5% and/or variations in the form of changes insignificant for the function.

Further embodiments, advantages and possible applications of the invention arise out of the following description of embodiments and out of the figures. All of the described and/or pictorially represented features whether alone or in any desired combination are fundamentally the subject matter of the invention independently of their synopsis in the claims or a retroactive application thereof. The content of the claims is also made an integral part of the description.

The invention is explained in detail below through the use of embodiment examples with reference to the figures. In the figures.

BRIEF DESCRIPTION OF THE FIGURES

Identical reference numbers are used in the figures for elements of the invention which are or act the same. For the sake of clarity the individual figures also only show those reference numbers necessary for describing the respective figure. By virtue of the possible mirror-symmetrical configuration of fastener 2, advantageous embodiments described in the context of first fastening portion BA1 also apply to second fastening portion BA2 of fastener 2 and vice versa.

DETAILED DESCRIPTION

Figure 1:
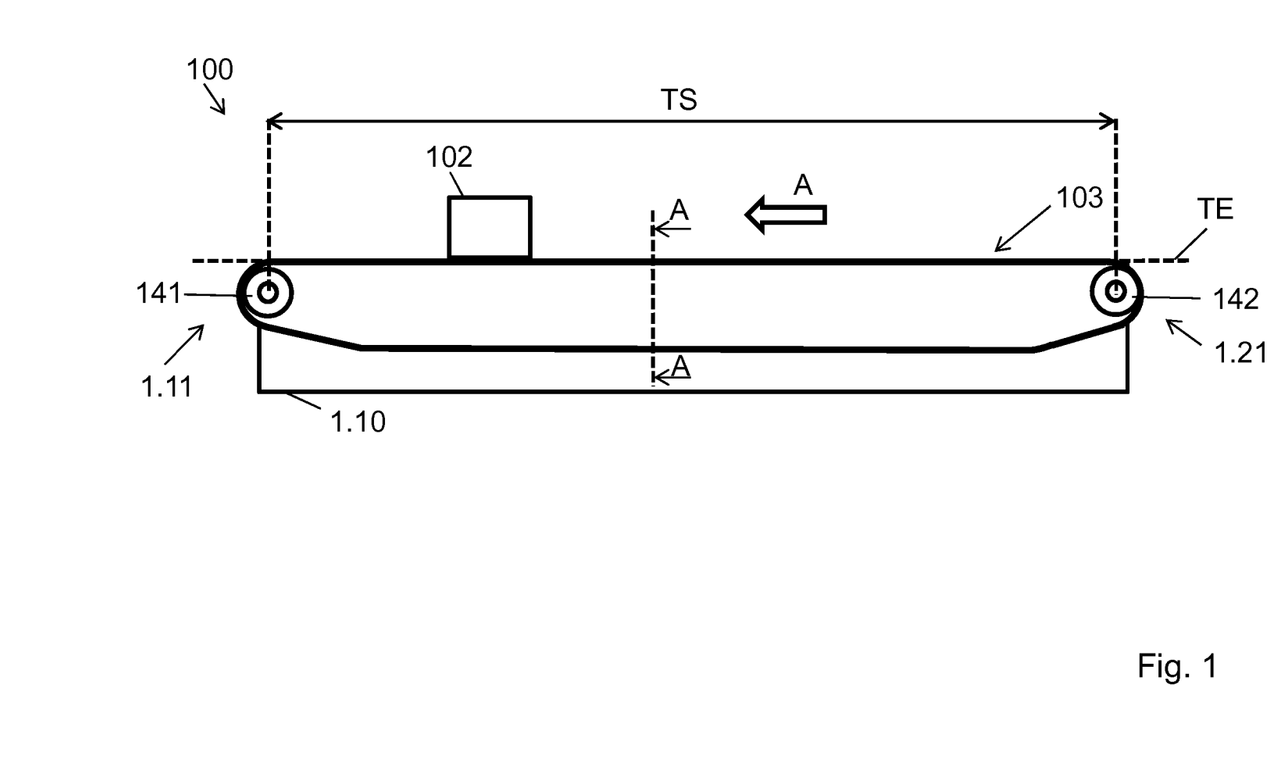
FIG. 1 is a side view of a conveying device.

FIG. 1 shows a conveyor 100 that conveys containers 102 along a transport direction "A" between various machines. The machines can be container treatment machines, handover stations, transfer stations, transition stations, or combinations thereof. A typical conveyor moves more than 10,000, and in some cases, more than 50,000 containers 102 per hour.

The transport direction "A" defines first and second perpendicular lines. The first perpendicular line passes through a transporter 103 along a "vertical" direction. The second perpendicular line extends along a "transverse" direction.

The conveyor 100 includes a transporter 103 that forms a closed loop. The transporter 103 circulates endlessly along the transport direction "A." Examples of a conveyor 100 include a transport belt, transport chain, flat-top chain.

Figure 2:
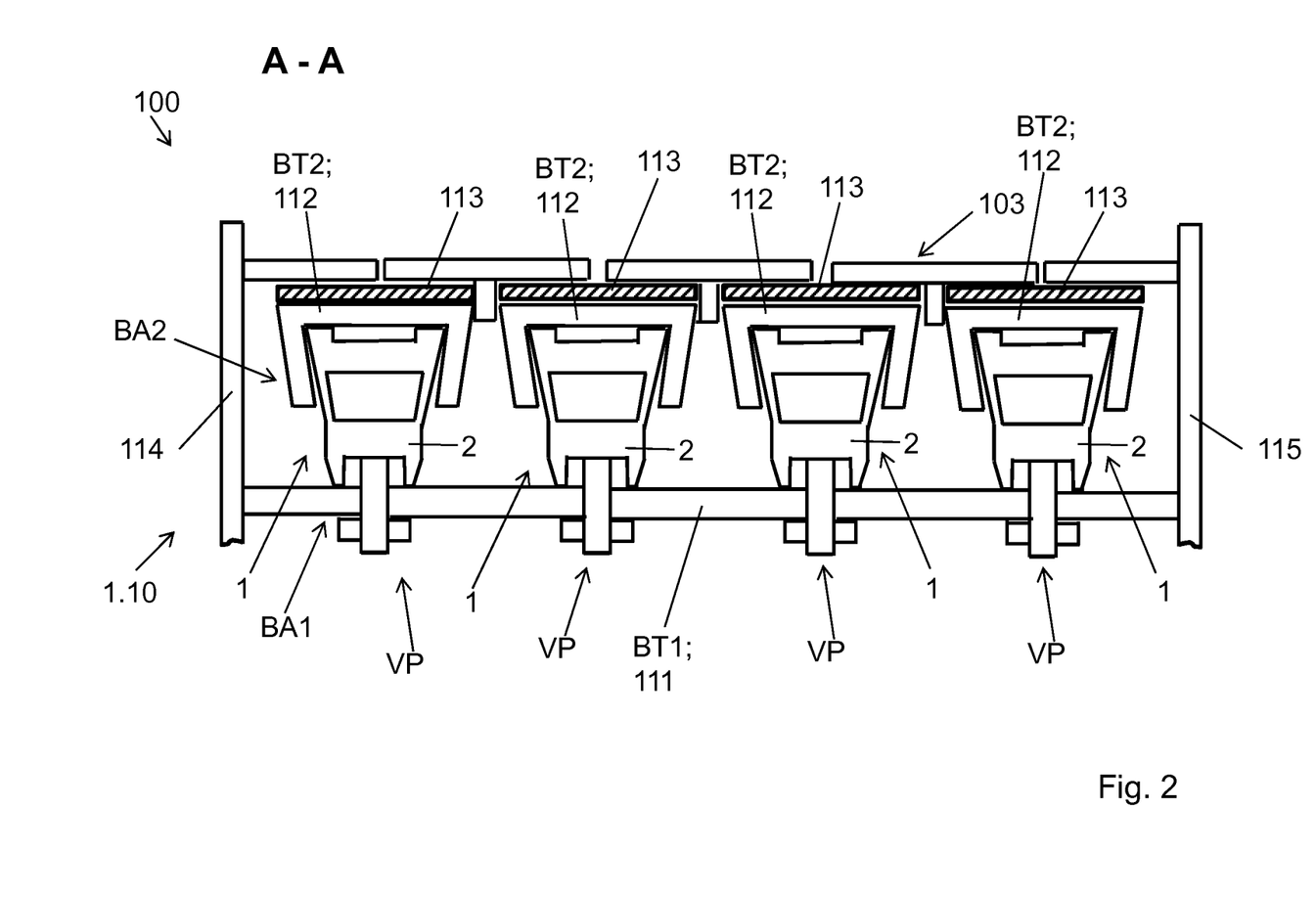
FIG. 2 is a sectional view of the conveying device of FIG. 1 taken along the section line "A."

As shown in FIG. 2, sliding bars 113 form a guideway that supports the upper length of the transporter 103. The transporter 103 thus forms a horizontal transport plane TE on which containers 102 stand on bases thereof. Typical implementations include several transporters 103 that are arranged next to each other to form multiple rows, as shown in FIG. 2.

The transporter 103 goes around a front deflection device 141 at a front end 1.11 and a rear deflection device 142 at a rear end 1.12. Between the front and rear ends 1.11, 1.12 is a conveying line TS. Each deflection device 141, 142 includes a motor that drives the deflection device 141, 142. A suitable motor is an electric motor. Suitable electric motors include a gearless electric motor, a directly driven electric motor, a stepping motor, a servomotor, and a torque motor.

The conveyor 100 includes a machine frame 1.10 on which the various components of the conveyor 100 are arranged. Legs, which are not shown, extend downward from the machine frame 1.10 to support the conveyor 100 on the floor.

Referring to FIG. 2, the frame 1.10 comprises a main body 111 that extends in transverse direction, which is the direction perpendicular to the transport direction "A." A fastener 2 connects a section element 112 connected detachably, yet firmly, to the main body 111.

The fastener 2 has a first fastening portion BA1 that a first component BT1 by which it attaches to the main body 111. It also has a second fastening portion BA2 for fastening to the section element 112. The second fastening portion BA2 has a second component BT2 to engage the section element 112.

FIG. 2 shows four such fasteners that have been attached to a common main body 111 by their respective first fastening portions BA1 and to corresponding section elements 112 by their second fastening portions BA2. Each section element 112 is permanently connected to a corresponding sliding bar 113, either by having been bolted, soldered, adhered, or welded. The sliding bar 113 is on the upper side of its corresponding section element 112.

The transporters 103 are guided so as to slide along the sliding bars 113 between right and left plates 114, 115 on either side of the main body 111. The section elements 112, the sliding bars 113, and the plates 114, 115 preferably extend over the entire length of transport path TS and can each be configured as a single part or, preferably, as a separate parts.

The fastener 2 can also be used to attach other parts, either directly or indirectly, in a detachable manner. Examples include electrical components and mechanical components. Examples of electrical components include switches and sensors. Examples of mechanical components include mirrors for light curtains, holders for rails that guide containers, retaining plates or strips for the attachment of other components, and switch cabinets for housing electrical circuits.

Figure 3:
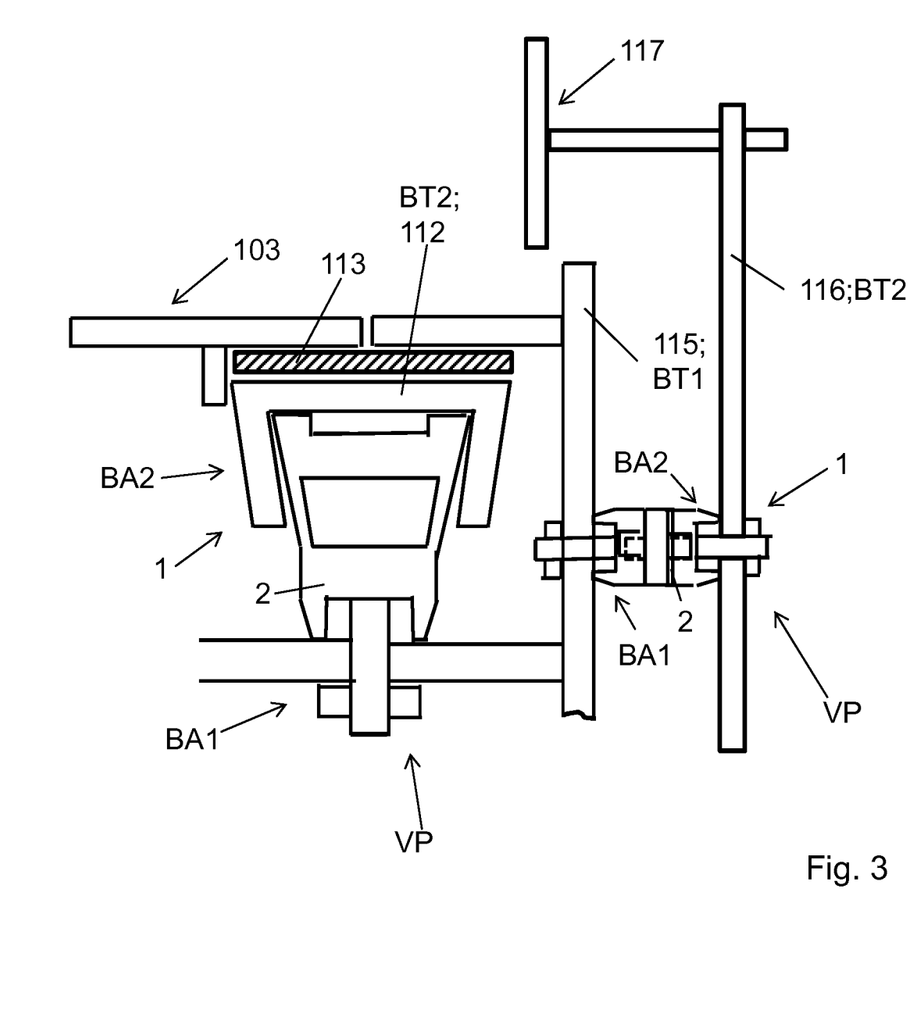
FIG. 3 shows a schematic side view of a partially depicted exemplary transport device with add-on component.

FIG. 3 shows a retaining plate 116 having an attached guide rail 117 that hangs over the right plate 115. A fastener 2 connects the retaining plate 116 to the right plate 115. As shown in the figure, the fastener's first fastening portion BA1 fastens to a first component BT1, which in this case is a portion of the right plate 115. The fastener's second fastening portion BA2 fastens to a second component BT2, which in this case is the retaining element 116. Both attachments are detachable.

Figure 4:
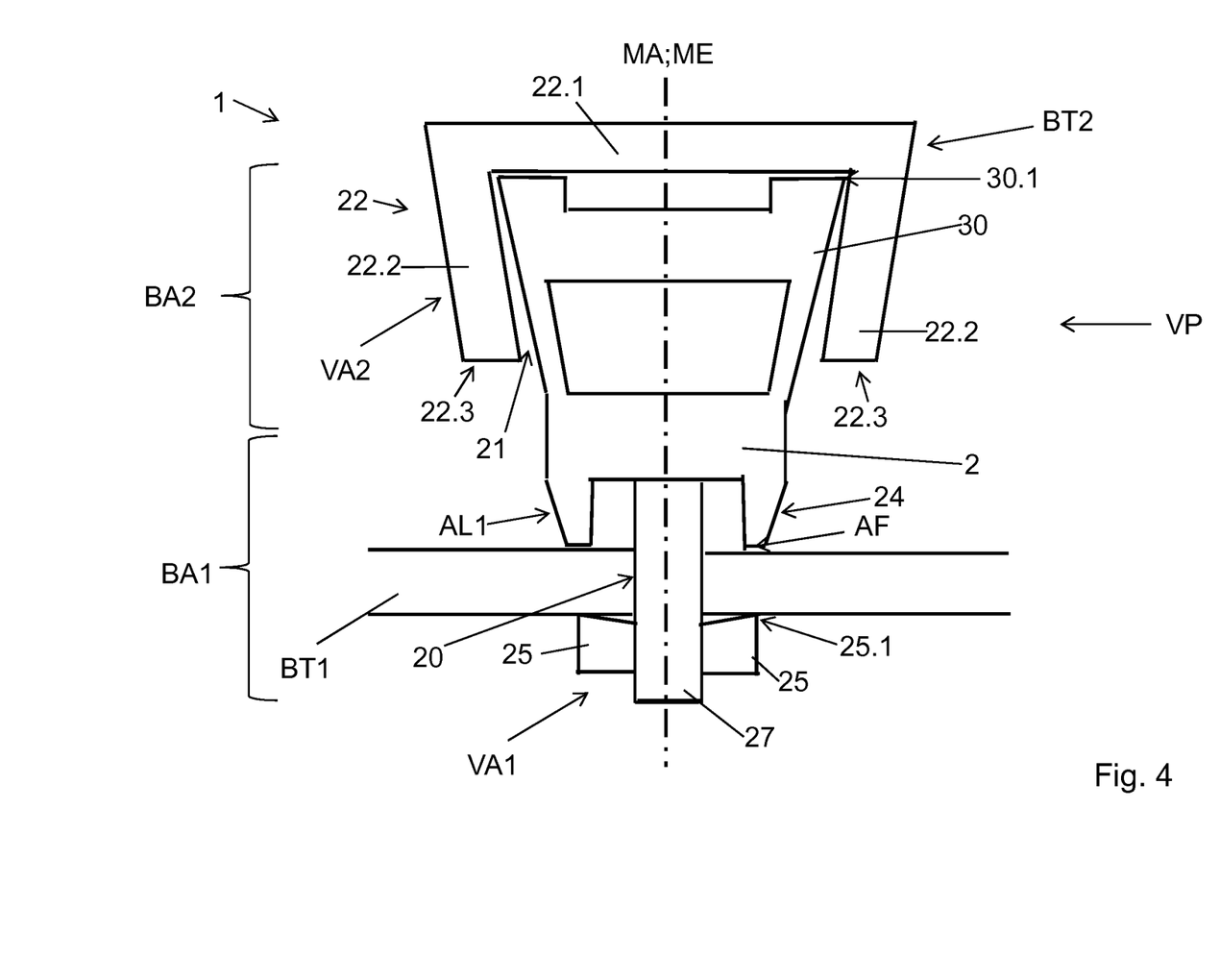
FIG. 4 shows a schematic side view of an exemplary embodiment of an inventive assembly with the fastener in a locking position.

FIG. 4 shows an assembly 1 in a locking position VP. The assembly 1 has a central axis MA that is in a central plane ME oriented perpendicular to the drawing sheet.

A fastener 2 detachably connects the first component BT1 to the second component BT2. The fastener 2 includes first and a second fastening portion BA1, BA2 that extend along the central axis MA and that lie opposite one another. The first fastening portion BA1 and the second fastening portion BA2 are in detachable working engagement with the first component BT1 and the second component BT2 respectively. As a result, the first component BT1 and the second component BT2 can be connected to one another by the first fastening portion BA1 and the second fastening portion BA2 respectively.

Figure 5A:
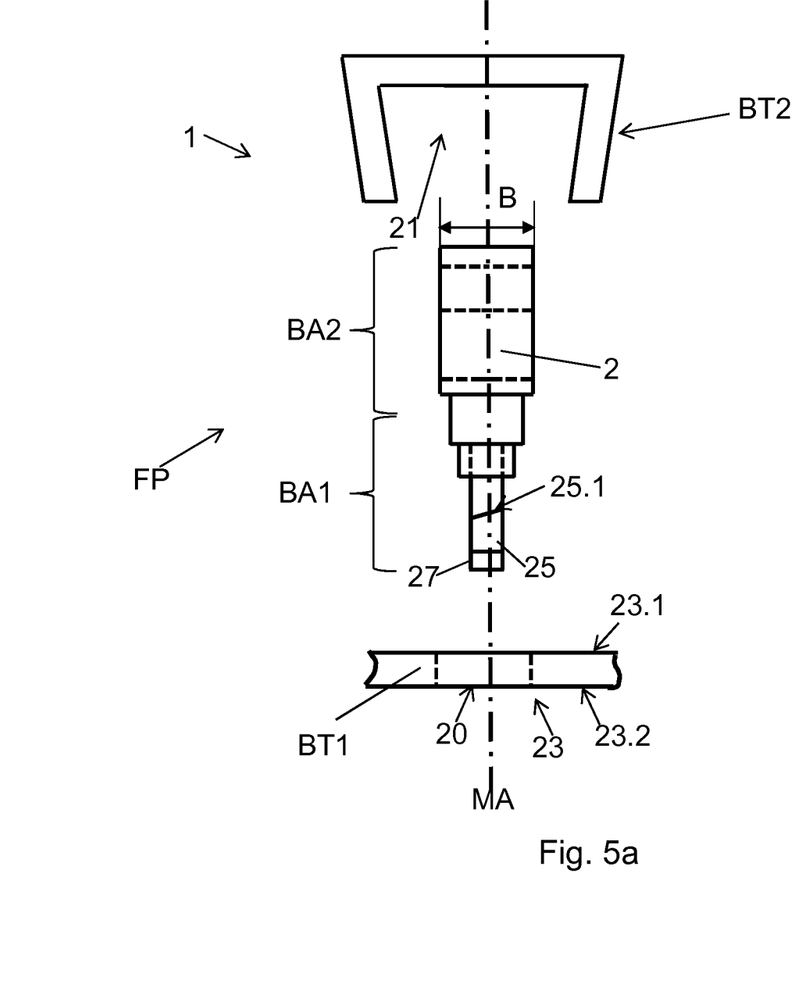
FIG. 5*a* shows a schematic exploded view of the embodiment of the inventive assembly according to FIG. 3 with the fastener in a release position.

The first fastening portion BA1 comprises a first locking portion VA1. The second fastening portion BA2 comprises a second locking portion VA2. As a result of these locking portions, the fastener 2 firmly holds the first and second components BT1, BT2 in a locking position VP but in a manner in which both components BT1, BT2 can still be detached, i.e. released, from the fastener 2 when the fastener 2 transitions into a release position FP, as shown in FIG. 5a.

Figure 5B:
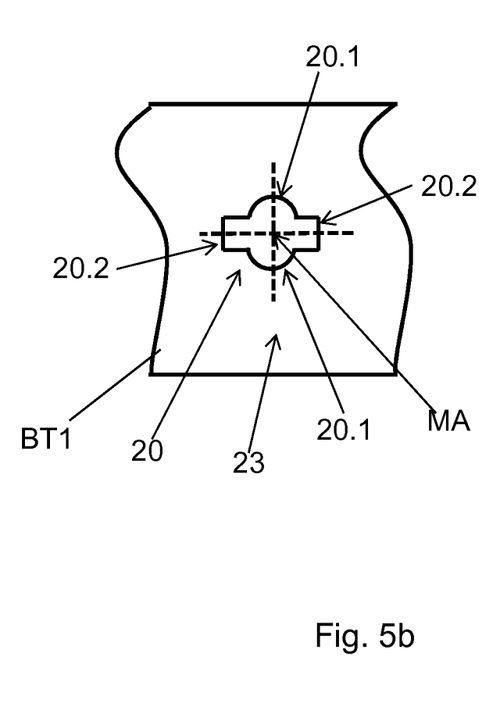
FIG. 5*b* shows a schematic plan view onto the preliminary hole or opening of a first or second component of which otherwise only a part is depicted.

Referring to FIG. 5b, the first component BT1 has a flat portion 23 with non-circular opening 20 extending through it. The opening's geometry is matched to that of the longitudinal section of the first locking portion VA1. As a result, it is possible to feed the first locking portion VA1 through the opening 20 so that it can be either clamped or fastened in an interlocking manner with the first component BT1 using the first fastening portion BA1 and rotation about the central axis MA.

As shown in FIG. 5b, the non-circular opening 20 is a mirror-symmetric hole having a pair of identical arcuate portions 20.1 and identical rectangular portions 20.2. The non-circular opening 20 can be formed by laser cutting, stamping or drilling.

In some embodiments, the first fastening portion BA1 includes a first contact portion AL1. The first contact portion AL1 takes the form of a locating slot 24. The locating slot 24 surrounds, or at least partially surrounds, the central axis MA. The locating slot's geometry is such that it cannot pass through the non-circular opening 20. Instead, it rests on the flat portion 23 around the non-circular opening 20 in a contact-locking manner.

The first locking portion VA1 comprises an extension 27 having a pair of locking elements 25 extending radially outward from its distal end. The extension 27 coaxially surrounds the central longitudinal axis MA. In a preferred embodiment, the extension's longitudinal extent matches the thickness of the first component BT1.

The locking element 25 extends radially outward from the extension 27. In some embodiments, the locking element 25 forms a locking finger. The locking element's cross-section matches that of the opening 20.

As shown in FIG. 4, each locking element 25 has a proximal side that forms a contact surface 25.1. The contact surface 25.1 defines an acute angle relative to the central axis MA.

To achieve the locking position VP, the extension 27 is rotated so that the locking elements 35 align with the rectangular portions 20.2. It is then advanced so that the locking elements 35 pass through the opening 20.

Once the locking elements 35 have passed through the non-circular opening 20, the extension 27 is rotated so that the locking elements 35 are no longer aligned with the rectangular portions 20.2. A rotation of about forty degrees is sufficient to prevent the extension 27 from being pulled out of the non-circular opening 20. In this position, the flat portion 23 is clamped between the contact surface 25.1 and a contact surface AF at the distal end of the projection AL1.

Referring to FIG. 5a, the flat portion 23 of the first component BT1 comprises an upper side 23.1 and an underside 23.2, both of which are flat or level. The upper side 23.1 faces the second fastening portion BA2. The underside 23.2 faces away from the second fastening portion BA2. The upper side 23.1 and the underside 23.2 are parallel. As a result, the flat portion 23 has a uniform thickness.

In the embodiment of FIG. 4, the second component BT2 comprises a profiled portion 22 that forms a cut-out 21. The profiled portion's cross-section matches the second locking portion's longitudinal section. As a result, the second locking portion VA2 can be accommodated within the cut-out 21, either by interlocking with it or by forming a force fitting with it. This results in releasable clamping of the second fastening portion BA2 on the second component BT2, which is achieved by rotating the second locking portion VA2 about the central axis MA.

In the illustrated embodiment, the second component BT2 is a section element comprising a C-shaped profiled portion 22, or "C-section element," and having a central leg 22.1 and two side legs 22.2, each of which has a corresponding free end 22.3. The side legs 22.2 extend in a direction that defines an acute angle to central plane ME so as to conform the shape of the cut-out 21 so that, when the profiled portion 22 engages the second locking portion VA2, the result is a secure fit.

Figure 6A:
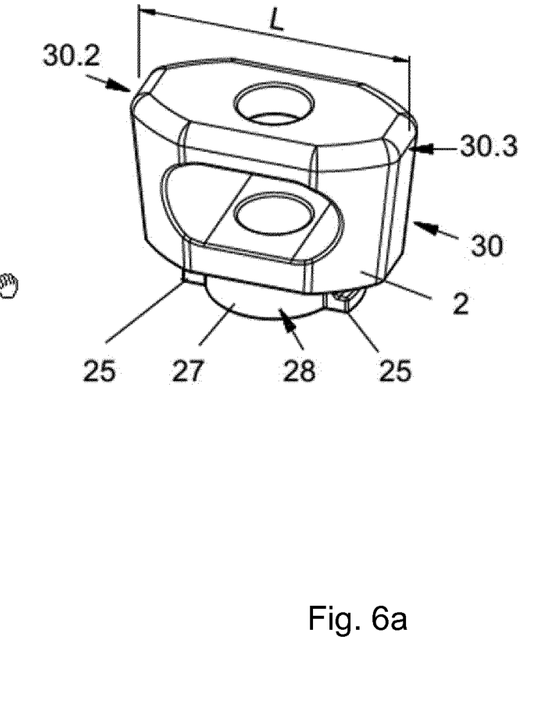
FIGS. 6*a* and 6*b* show respectively a perspective and a lateral schematic sectional view of an embodiment of a fastener on its own, FIGS. 7*a* and 7*b* each show a schematic side view of different embodiments of a fastener on its own.

The fastener's second locking portion VA2 includes a clamping body 30. As shown in FIG. 6a, the clamping body 30 has an oval cross section with a length L along its major axis. Referring to FIG. 5a, the oval cross section has a width B along its minor axis. As shown in FIG. 4, the clamping body 30 tapers from a maximum length L at an end portion 30.1 adjacent to the second component BT2 to a minimum at the first component BT1.

On opposite sides of the end portion 30.1, the clamping body features straight contact surfaces 30.2, 30.3. When the fastener 2 is locked, these contact surfaces 30.2, 30.3 press against corresponding inner sides of both side legs 22.2. This causes the clamping body 30 to clamp the second component BT2.

The two lateral leg portions 22.2 are configured to be elastically deformable. As a result, twisting the clamping body 30 will twist the contact surfaces 30.2, 30.3, which in turn causes the lateral leg portions 22.2 to yield and deflect outward. This enables the fastener 2 to be detached. To transition into the release position FP shown in FIG. 5a from the locking position VP shown in FIG. 4, the fastener's second locking portion VA2 is rotated by about forty degrees relative to the profiled portion 22.

In a preferred embodiment, the fastener 2 is formed from a single part. As a result, rotating the second fastening portion BA2 also rotates the first fastening portion BA1.

In FIG. 5a, the clamping body 30 has been rotated so that its narrow end is visible. The width B of the clamping body's narrow end is matched to the cross-section of the profiled portion 22 in such a way that the clamping body 30 can easily be removed from or introduced into the profiled portion's cut-out 21. The position shown is therefore a release position.

Referring now to FIG. 6a, the length L between the opposing contact surfaces 30.2, 30.3, the clamping body 30 is such that the clamping body 30 is able to press firmly against the inner sides of the second component's two side legs 22.2, thus creating a clamping seat. The clamping body 30 is also configured such that rotating from the release position FP to the locking position VP causes it to press against the underside of the central leg portion 22.1. This results in the fastener 2 having a defined position relative to the second component BT2.

Figure 6B:
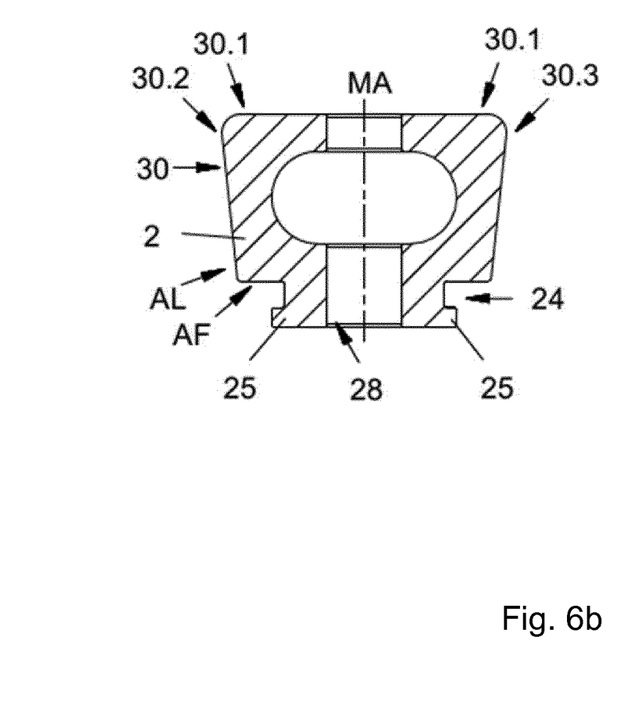

The act of twisting the clamping body 30 is best done with a tool. As such, the fastener comprises an opening 28 in the region of the extension 27, as shown in FIGS. 6a and 6b. This opening has walls that define a hexagon to receive a hex key. Turning the hex key provides an easy way to twist the clamping body 30.

Figure 7A:
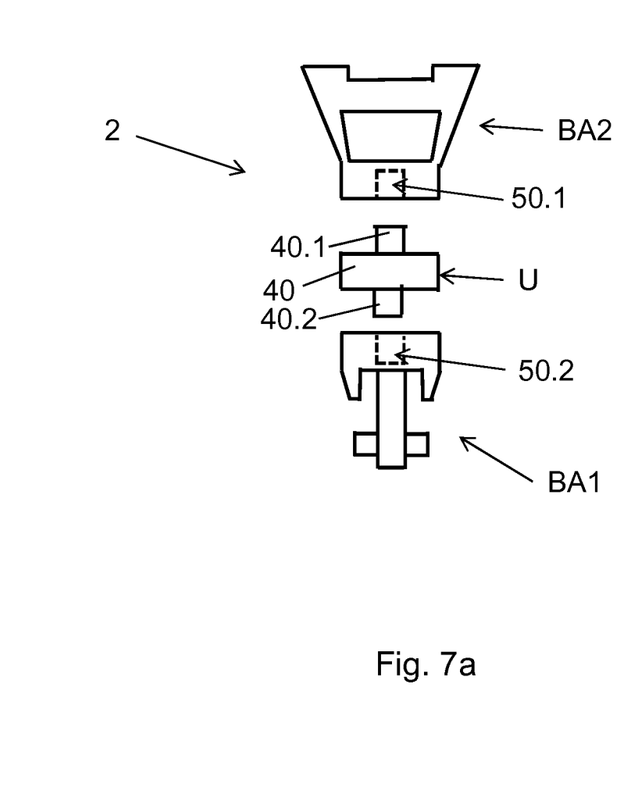
Figure 7B:
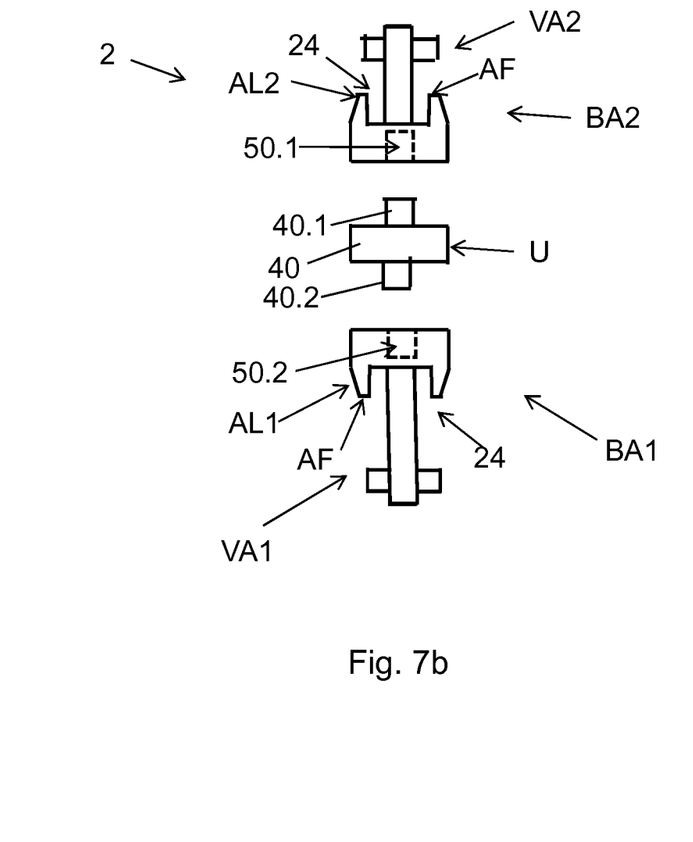

FIGS. 7a and 7b show a two-part fastener 2 having an intermediate piece 40 that firmly connects the first fastening portion BA1 to the second fastening portion BA2. A suitable intermediate piece 40 is a spacer that is made from a solid material. The spacer 40 includes noise-shaped or tubular connecting portions 40.1, 40.2 that engage corresponding receiving portions 50.1, 50.2 in the first and second fastening portions BA1, BA2 respectively. The receiving portions 50.1, 50.2 have a geometry that matches that of the connection portions 40.1, 40.2. IN the illustrated embodiment, the receiver portions 50.1, 50.2 are blind holes. The connection portions 40.1, 40.2 are typically screwed, glued, soldered, or welded to their corresponding receiving portions 50.1, 50.2. The respective connecting portion 50.1 50.2 can be matched in its geometrical configuration to the corresponding connecting portion 40.1, 40.2, configured for example as a blind hole.

In the embodiment shown in FIGS. 7a and 7b, the intermediate piece 40 has a peripheral surface U. This provides a convenient engagement face for a tool that can be used to twist the clamping body 30 between its release position FP and its locking position VP. For example, the peripheral surface U can be shaped to have several corners for engaging such tools as an open-end wrench or spanner. The tool can then be used to impart the twisting force for transitioning between the release position FP and the locking position VP.

In the embodiment shown in FIG. 7b, the first and second fastening portions BA1, BA2 are identical. In the example shown, both fastening portions BA1, BA2 are like the first fastening portion BA1 of the embodiment of FIGS. 4 and 5. However, in other embodiments, identical first and second fastening portions BA1, BA2 are like the second fastening portion BA2 of FIGS. 4 and 5.

To permit releasable clamping, the first component BT1 comprises, at least in a flat portion 23, a non-circular hole 20 that is shaped to match the first locking portion VA1 in such a way that the first locking portion VA1 can be fed through the preliminary hole 20 and then rotated about the central axis MA to clamp the fastener 2 to the first component BT1.

In the alternative, the first component BT1 has a profiled portion 22 that forms a cut-out 21, the cross-section of which matches that of the first locking portion VA1 in such a way that twisting the first fastening portion BA1 about the central axis MA twists the first locking portion VA1 to clamp or unclamp the first component BT1. This occurs in part because the cut-out 21 receives and interlocks with the first locking portion VA1.

As a result of having a symmetrical configuration, releasable clamping can be carried out by having a second component BT2 that includes a flat portion 23 having a non-circular opening 20 extending through it. The hole's shape matches that of the second locking portion VA2 so that the second locking portion VA2 can be fed through the hole 20 and twisted into a locking position.

Releasable clamping is also carried out by having a second component BT2 with a profiled portion 22 that forms a cut-out whose cross-section is matched to that of the second locking portion VA2 thus enabling the second locking portion VA2, or a portion thereof, to be received into the cut-out 21 to form an interlocking engagement therewith.

Figure 8:
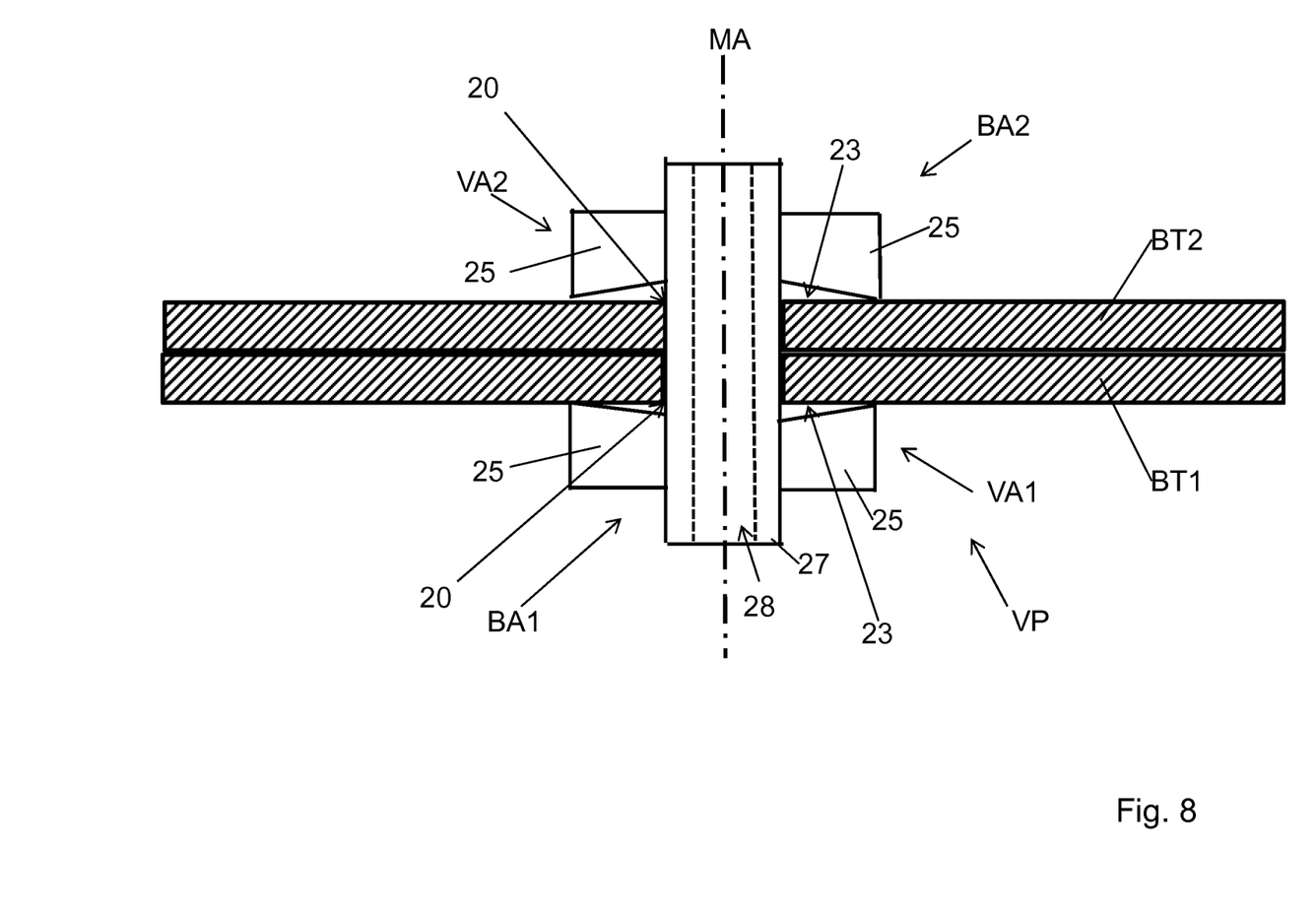
FIG. 8 shows a schematic side view of a further embodiment of an inventive assembly.

An assembly shown in FIG. 8 lacks the first and second contact portions AL1, AL2 and the locating slot 24. Instead, the first and second components BT1, BT2 form their own respective contact surfaces.

Each of the first and second component BT1, BT2 has a flat portion 23 having a non-circular hole 20 extending therethrough. First and second locking portion VA1, VA2 are reciprocally supported in the locking position VP. The first and second fastening portion BA1, BA2 each comprise a locking element 25. These locking elements 25 operate in the same manner discussed in connection with FIGS. 4 and 5. as was explained in greater detail in the context of the embodiment of FIGS. 4 and 5.

The fastener 2 also includes a passage 28 through the first and second fastening portions BA1, BA1. In the region near the extension 27, the passage 38 has an inner surface formed to engage a tool to facilitate twisting between the release and locking positions FP, VP. In some examples, the inner surface defines an internal hexagon to engage a hex key. which provides an engagement face for a tool, for example an Allen key, so that the rotary movement between the release position FP and the locking position VP can be introduced by the tool to the fastener 2.

Other embodiments omit the intermediate piece 40 shown in FIGS. 7a and 7b. Instead, the first fastening portion BA1 has a prismatic contact surface AF that includes passage along its central axis. The bore of this passage has a central axis that is congruent with the central axis of the first fastening portion BA1.

In other embodiments, for the second fastening portion BA2 contains both the second locking portion VA2 and the first locking portion VA1. Assembly proceeds with the locking portion VA1, which is present on second fastening portion BA2, being passed through the passage present in first fastening portion BA1 and then being passed through the non-circular hole 20 present in first component BT1 and fixed there in the manner discussed in connection with the other embodiments. In such embodiments, the fastening portions BA1, BA2 are fixed against one another, thus eliminating the need for an intermediate piece 40.

In some embodiments, the assembly is configured in such a way that the first fastening portion BA1 passes through the second fastening portion BA2 which it then fixes.

The invention claimed is:

1. An apparatus comprising an assembly for detachably connecting first and second components, said assembly comprising a fastener that transitions between a locking position and a release position, wherein said fastener comprises a first fastening portion and a second fastening portion, wherein said first fastening portion connects to said first component, wherein said second fastening portion connects to said second component, wherein said first and second fastening portions are disposed opposite each other along an axis of said fastener, wherein said first fastening portion comprises a free end and a first locking portion mounted at said free end, wherein said first locking portion comprises a clamping body having a cross section with a length and a width, wherein said width is matched to a cross section of a profiled portion that is a constituent of said first component in such a way that when said fastener is in a release position, said clamping body is introducible into a cut-out formed by said profiled portion, wherein a cross section of said first locking portion matches that of a non-circular opening through a flat portion of said first component, wherein, after having been fed through said non-circular opening and after a rotation of said first fastening portion about said axis has placed said fastener in said locking position, said first locking portion is prevented by said flat portion from passing back out through said non-circular opening, or wherein said second component comprises a profiled portion that forms a cut-out, said cut-out having a cross-section that matches that of a locking portion of said second fastening portion such that said locking portion can be received by said cut-out when said fastener is in said release position and made to form an interlocking fit with said cut-out as rotation of said locking portion about said axis brings transitions said fastener into said locking position.

2. The apparatus of claim 1, wherein said second fastening portion comprises a second locking portion on a free end thereof, wherein said second component comprises a flat portion having a non-circular opening formed therethrough, said opening having a shape that is selected such that said locking portion of said second fastening portion is able to be fed through said opening, wherein twisting said fastener after said locking portion has been fed through said opening clamps said second fastening portion to said second component.

3. The apparatus of claim 1, wherein said second fastening portion comprise a locking portion on a free end thereof, wherein said cut-out has a cross-section that matches a cross-section of said second locking portion such that said second locking portion is received in said cut-out, wherein rotating said locking portion causes said cut-out and said second locking portion to interlock.

4. The apparatus of claim 1, wherein said first fastening portion comprises a free end, wherein said first locking portion is at said free end, wherein said first locking portion comprises a locking element that extends radially outward from said axis.

5. The apparatus of claim 1, wherein said first fastening portion comprises a first contact portion that lies adjacent to said first locking portion along said axis, wherein said first contact portion forms a locating slot that extends square to said axis.

6. The apparatus of claim 1, further comprising a locating slot that extends square to said axis, said locating slot being formed by a first contact portion of said first fastening portion, said first contact portion being adjacent to said first locking portion along said axis, wherein said locating slot forms a contact surface on a surface portion that faces said first component and wherein said locating slot extends along at least a portion of a circumference of a circle that surrounds said axis.

7. The apparatus of claim 1, wherein said first fastening portion comprises, at a free end thereof, a locking portion that comprises a radially-extending locking element wherein, when said fastener is in said locking position, after said locking element has been fed through said non-circular opening and said fastening device has been rotated relative to said first component, said locking element engages an underside of said flat portion, wherein said underside faces away from said second fastening portion.

8. The apparatus of claim 1, wherein said first fastening portion comprises, at a free end thereof, a locking portion that comprises a radially-extending locking element wherein, when said fastener is in said locking position, after said locking element has been fed through said non-circular opening and said fastening device has been rotated relative to said first component, said locking element engages an underside of said flat portion, wherein said underside faces away from said second fastening portion, wherein, after rotation of said first locking portion has caused said locking element to come into form-fitting contact with an underside of said flat portion of said first component, said first component is pressed against said contact surface of a locating slot and said flat portion is held between said contact surface and said locking element.

9. The apparatus of claim 1, wherein said first locking portion comprises a clamping body having an end portion that faces said second component, wherein said clamping body has a length that decreases along said axis, and wherein said length is greatest at said end portion.

10. The apparatus of claim 1, wherein said first locking portion comprises a clamping body having a free-end portion having first and second sides disposed opposite to each other and, first and second contact surfaces, and an end portion that faces said second component, wherein said first contact surface is at said first side, and wherein said second contact surface is at said second side.

11. The apparatus of claim 1, wherein said profiled portion is a C-shaped profiled portion that defines said cut-out, wherein said profiled portion comprises a first side leg, and a second side leg, and a central leg that separates said first and second side legs.

12. The apparatus of claim 1, wherein said first locking portion comprises a clamping body having an end portion that faces said second component, wherein said clamping body has a length that decreases along said axis, and wherein said length is greatest at said end portion, wherein, when said fastener is in said locking position, said end portion and said straight contact surfaces engage inner sides of said side legs such that said clamping body forms a clamping seat on said cut-out.

13. The apparatus of claim 1, wherein said second fastening portion comprises a locking element that extends radially outward from said axis and wherein said locking element is disposed at a free end of a locking portion of said second fastening portion.

14. The apparatus of claim 1, wherein said second fastening portion comprises a first locking portion at a free end thereof and a second contact portion that lies adjacent to said first locking portion along said axis, wherein said second contact portion forms a locating slot that extends in a direction perpendicular to said axis.

15. The apparatus of claim 1, wherein said second fastening portion comprises a first locking portion at a free end thereof and a second contact portion that lies adjacent to said first locking portion along said axis, wherein said second contact portion forms a locating slot that extends in a direction perpendicular to said axis and that is disposed along a circumference of a circle centered on said axis, wherein said locating slot forms a contact surface on a surface that faces said second component.

16. The apparatus of claim 1, wherein said second fastening portion comprises a locking element that extends radially outward from said axis and wherein said locking element is disposed at a free end of a locking portion of said second fastening portion, wherein, when said fastener is in said locking position, said locking element is fed through said non-circular opening and rotated relative to said second component such that said locking element engages behind said non-circular opening on a side that faces away from said first fastening portion.

17. The apparatus of claim 1, wherein said second fastening portion comprises a locking element that extends radially outward from said axis and wherein said locking element is disposed at a free end of a locking portion of said second fastening portion, wherein, when said fastener is in said locking position, said locking element is fed through said non-circular opening and rotated relative to said second component such that said locking element engages behind said non-circular opening on a side that faces away from said first fastening portion, wherein, when said fastener is in said locking position, said second component is pressed against a contact surface of a locating slot and said flat portion is clamped between said contact surface and said locking element.

18. The apparatus of claim 1, wherein said locking portion of said second fastening portion comprises a clamping body having an end portion that faces said second component, wherein said clamping body has a cross section, said cross section having a length that varies along said axis, wherein said length is greatest at said end portion and least at said first fastening portion.

19. The apparatus of claim 1, wherein said locking portion of said second fastening portion comprises a clamping body, wherein said clamping body comprises straight contact surfaces and a free end portion between said contact surfaces, wherein said contact surfaces are on opposite sides of said clamping body.

20. The apparatus of claim 1, wherein said profiled portion comprises a C-shaped profiled portion that defines a cut-out for receiving said fastener.

21. The apparatus of claim 1, wherein said locking portion of said second fastening portion comprises a clamping body having an end portion that faces said second component, wherein, in said locking position, said clamping body forms a clamping seat in said cut-out, wherein said clamping body has straight contact surfaces on opposite sides of a free end, wherein, in said locking position, said free end and said contact surfaces are clamped against inner sides of legs of said profiled portion.

22. The apparatus of claim 1, wherein said locking portion of said second fastening portion comprises a clamping body, wherein said clamping body comprises a cross section having a width, wherein said width is match to said profiled portion such that, when said fastener is in said release position, said clamping body is introducible into said cut-out.

* * * * *